United States Patent

Lowery et al.

[15] 3,700,808

[45] Oct. 24, 1972

[54] DISTORTION ANALYSIS SYSTEM AND METHOD

[72] Inventors: Ronald M. Lowery, Lutherville; Daniel J. Summers, Jr., Kingsville, both of Md.

[73] Assignee: Computest Corporation, Cherry Hill, N.J.

[22] Filed: Oct. 7, 1971

[21] Appl. No.: 187,320

[52] U.S. Cl. ....................178/69 A

[51] Int. Cl. ....................H04l 25/02

[58] Field of Search ....178/69 A, 69 R; 179/175.2 A; 340/166 EL

[56] References Cited

UNITED STATES PATENTS

| | | | |
|---|---|---|---|
| 3,045,061 | 7/1962 | Slayton | 178/69 A |
| 2,856,457 | 10/1958 | Prior et al. | 178/69 A |

*Primary Examiner*—Kathleen H. Claffy
*Assistant Examiner*—Douglas W. Olms
*Attorney*—Maleson, Kimmelman and Ratner

[57] ABSTRACT

A distortion analysis system and method in which the occurrence of each actual transition of bits in a character is displayed in its position with reference to a first transition of the character. A plurality of light emitting elements are formed in an array of columns and mapped rows. At the time of the first transition, a first count is made to a predetermined value and then continuously repeated with each count being associated with a different one of the columns. Each time the first count reaches the predetermined value, a second count counts up one with the second count being associated with a different one of the mapped rows. The first and second count which have accrued at the time of each transition are detected and an element is lit which is in both a column associated with the accrued first count and the mapped row associated with the second count.

23 Claims, 8 Drawing Figures

INVENTORS
RONALD M. LOWERY
DANIEL J. SUMMERS, JR.
BY
Maleson, Kimmelman & Ratner
ATTORNEYS.

INVENTORS
RONALD M. LOWERY
DANIEL J. SUMMERS, JR.
BY
Maleson, Kimmelman & Ratner
ATTORNEYS.

INVENTORS
RONALD M. LOWERY
DANIEL J. SUMMERS, JR.
BY
Maleson, Kimmelman & Ratner
ATTORNEYS.

INVENTORS
RONALD M. LOWERY
DANIEL J. SUMMERS, JR.
BY
Maleson, Kimmelman & Ratner
ATTORNEYS.

INVENTORS
RONALD M. LOWERY
DANIEL J. SUMMERS, JR.
BY
Malcolm, Kimmelman & Ratner
ATTORNEYS.

INVENTORS
RONALD M. LOWERY
DANIEL J. SUMMERS, JR.
BY
Malcolm, Kimmelman & Ratner
ATTORNEYS

DISTORTION ANALYSIS SYSTEM AND METHOD

BACKGROUND OF THE INVENTION

A. Field of the Invention

This invention relates to the field of art of distortion analyzers used to display distortion in digital data transmission.

B. Prior Art

Distortion analyzers have been used to analyze transmission of data that is framed into characters such as teletypewriter transmission. In this mode of transmission, generally referred to as asynchronous or start/stop operation, each character that is transmitted comprises a start bit, a fixed number of data bits and completing the character, a stop bit. In the commonly used Baudot Code, characters contain a start bit, five data bits and a stop bit. This code is also called a five unit start/stop code. In the American Standard Code For Information Interchange (ASCII), there are eight data bits preceded by a start bit and followed by a stop bit.

When characters are transmitted asynchronously, there is no fixed time interval between characters. For example, if the characters are transmitted from a teletypewriter keyboard, the time interval between characters will be a function of the typist. In this manner, each character is transmitted and received as a separate entity. Within the character, the start bit and each of the data bits are of equal duration with this duration being defined as a unit interval. The unit interval is the reciprocal of the modulation rate of the signal being transmitted. The two binary conditions of the bits in the character are called "mark" and "space" where the start bit is always a space and the stop bit is always a mark and each of the data bits may be marks or spaces depending on the coding.

Known receivers use the start bit for synchronization to the data with the beginning of the start bit (reference) establishing the anticipated time of occurrence of each of the succeeding data bits. The stop bit restores the receiver to a quiescent state to await the next character.

As known in the art, distortion of such asynchronous signals comprises the displacement of any one or all of the data bits in a character from their theoretically correct position relative to the reference. If each transition from one bit to the next within the character occurs at its theoretically correct position, there is zero distortion. However, any displacement of these transitions results in a distortion of the signal. Thus, distortion is conventionally defined as displacement of a transition (mark to space or space to mark) from its theoretically correct time of occurrence. Distortion is expressed as a percentage of a unit interval at the data modulation rate. For example, at a 100 baud modulation rate, the unit interval is ten milliseconds. If a transition is displaced 1 millisecond, it is therefore distorted 10 per cent. Distortion has further been defined as marking and spacing. If transitions are displaced so that mark data bits are longer than correct duration, the distortion is called marking distortion. On the other hand, if the space data bits are elongated, the distortion is called spacing distortion. It has also been known to define distortion in more specific terms, such as bias, fortuitous, characteristic, speed, cyclic, etc. These terms relate to the causes of distortion.

Prior distortion analyzer systems have left much to be desired in their ability to provide both the percentage of distortion present and in distinguishing the specific types or causes of distortion. Some prior distortion analyzers have used meter readouts which only provide quantitative measurements and are usable for analysis only after a time consuming series of measurements and a mathematical analysis of the results. Other prior analyzers are of the cathode ray tube type which has analytic capability but are slow in speed and have the disadvantage of requiring continuous calibration and adjustment.

SUMMARY OF THE INVENTION

A distortion analysis system and method in which the occurrence of each actual transition of bits in a series of bits is displayed in its position with reference to a predetermined initial time. A plurality of elements which emit light upon being energized are formed in an array which define (1) a sequence of groups of elements arranged in a first direction and (2) a sequence of groups of elements arranged in a second direction. A first counting system counts up by a first count to a predetermined value starting at the predetermined time and thereafter continuously repeats the count until being reset. Each count in the first count is associated with a different one of the first direction groups. A second counting system counts up one by a second count each time the first count reaches the predetermined value. Each unitary count in the second count is associated with a different one of the second direction groups. The first and second counts which have accrued at the time of each transition are detected and an element is lit which is in both (1) a first direction group associated with the accrued first count and (2) a second direction group associated with the accrued second count. In this manner, there is a display of the percentage distortion and the specific types or cause of distortion may be distinguished.

GENERAL DESCRIPTION OF OPERATION

Figure 1:
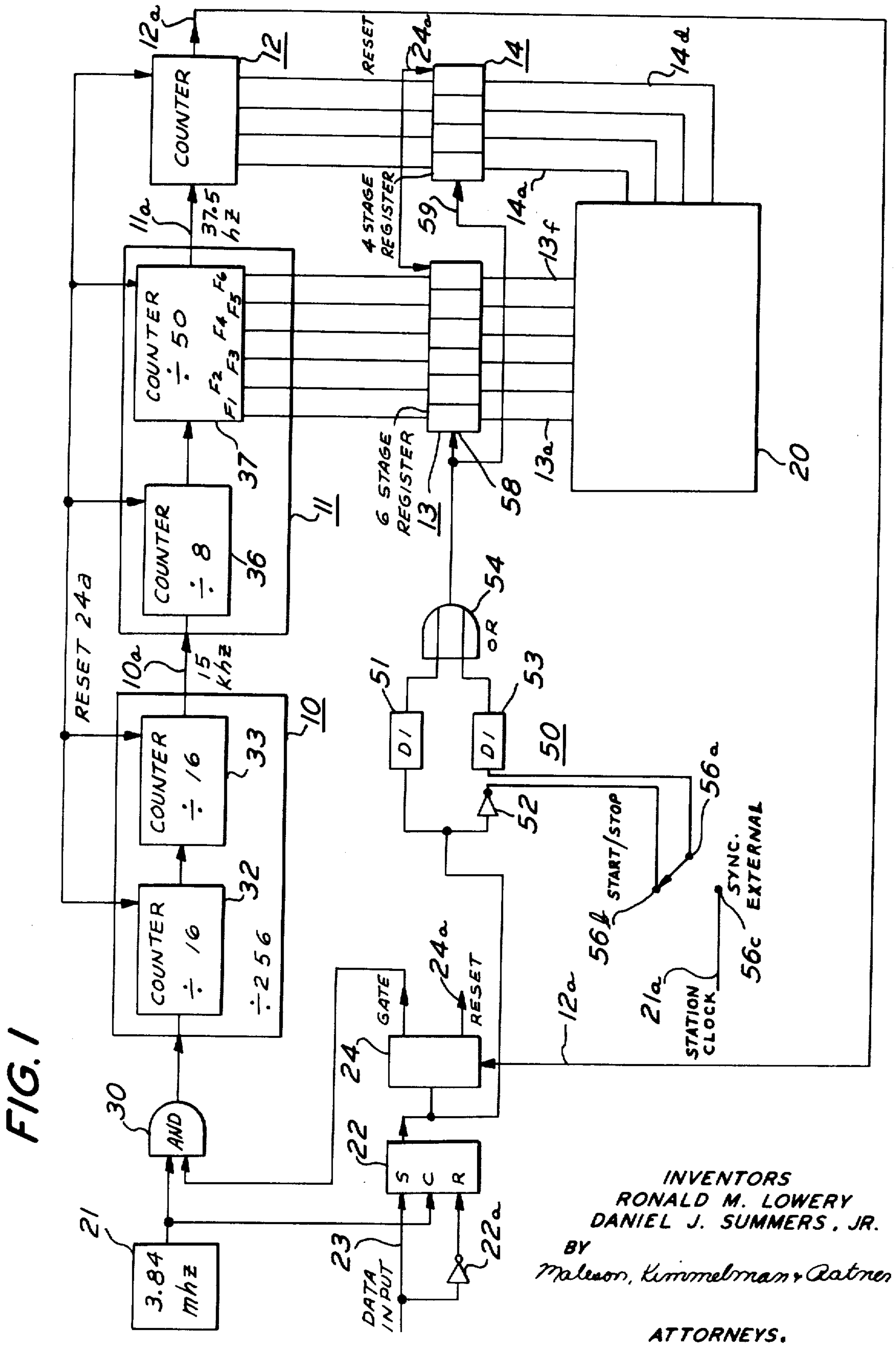
FIG. 1 illustrates in block diagram form a distortion analysis system according to the invention.
Figure 3A:
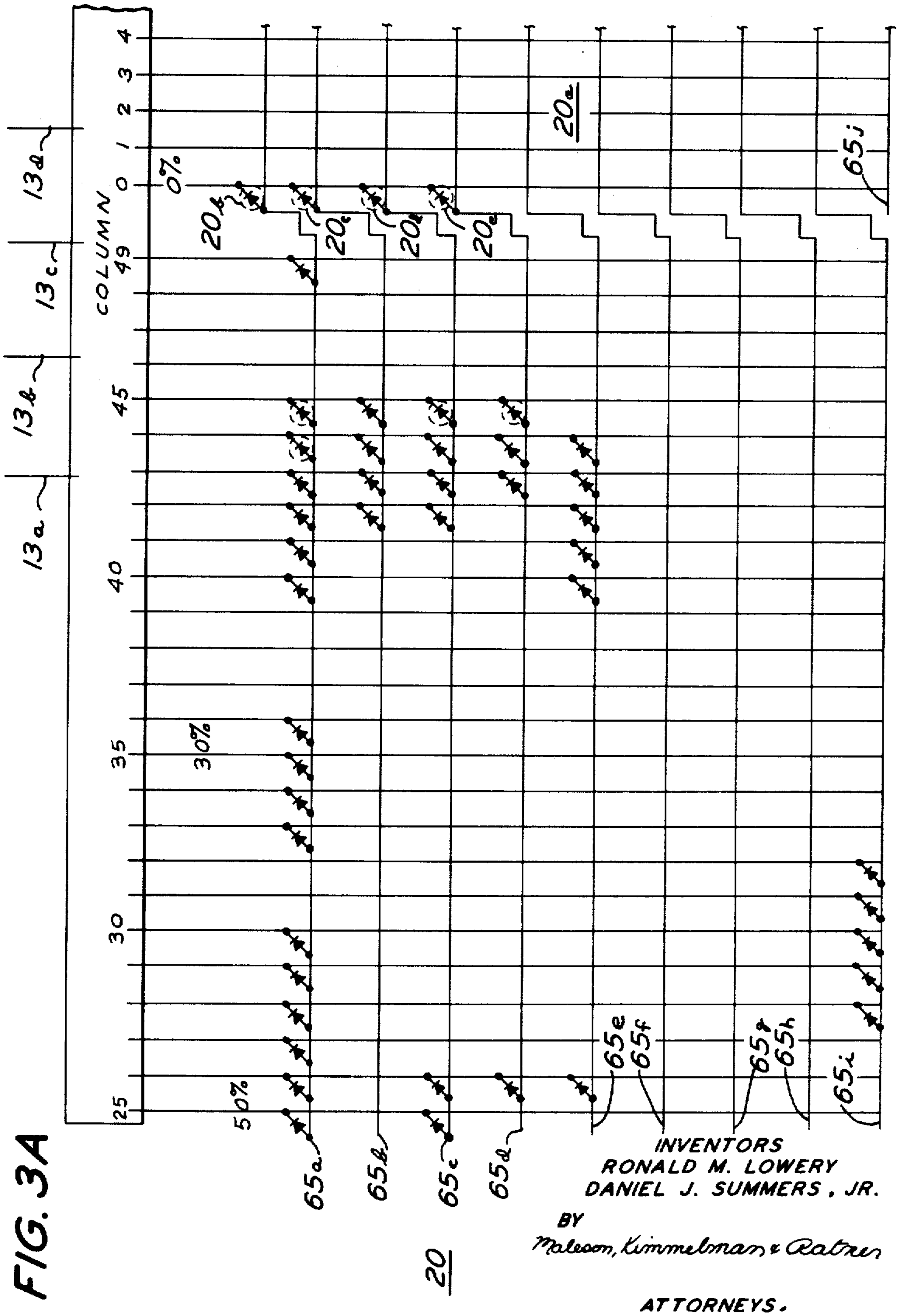
FIGS. 3A–B illustrate in detail a rectangular array which may be used with the system of FIG. 1.
Figure 3B:
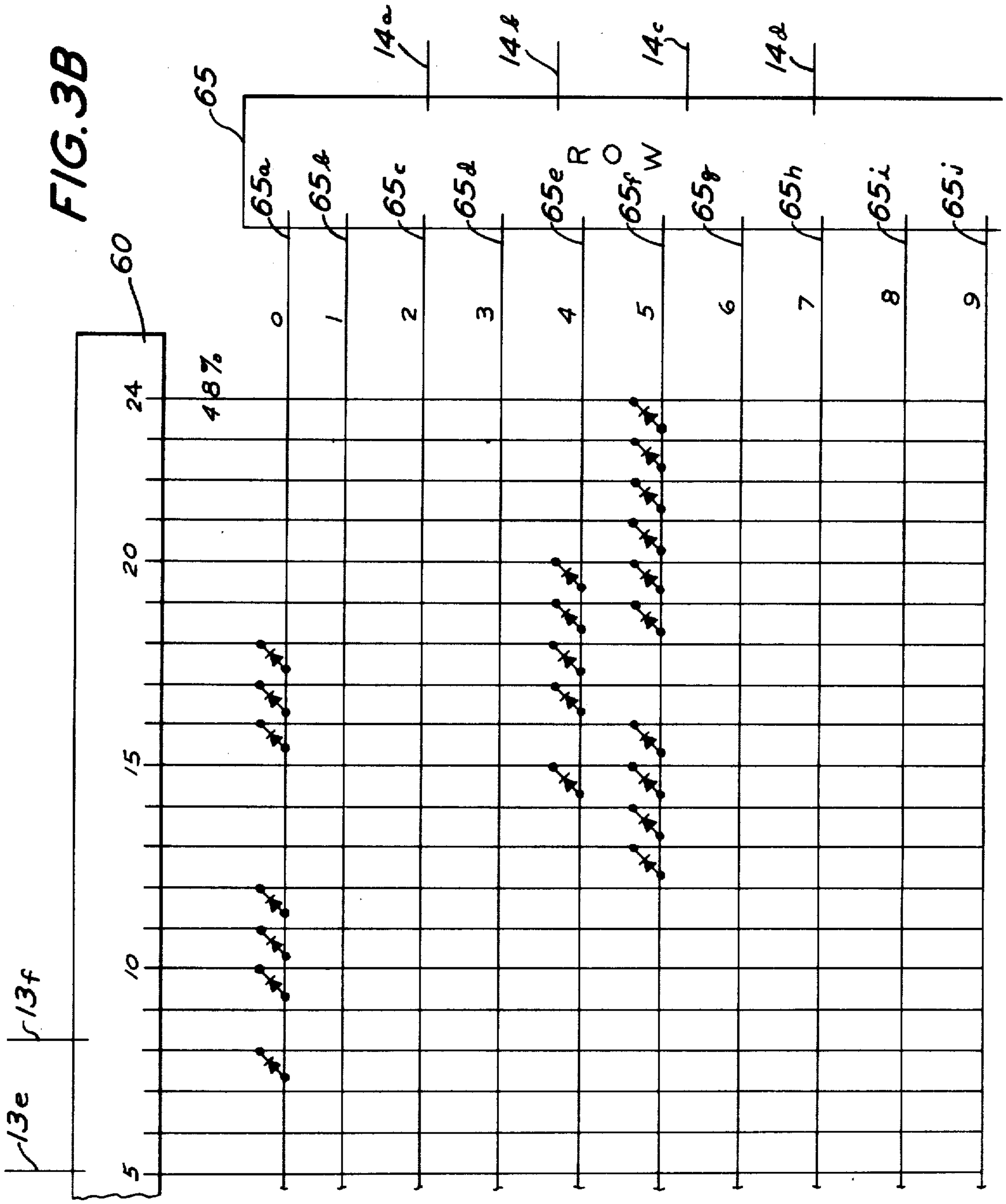
Figure 4:
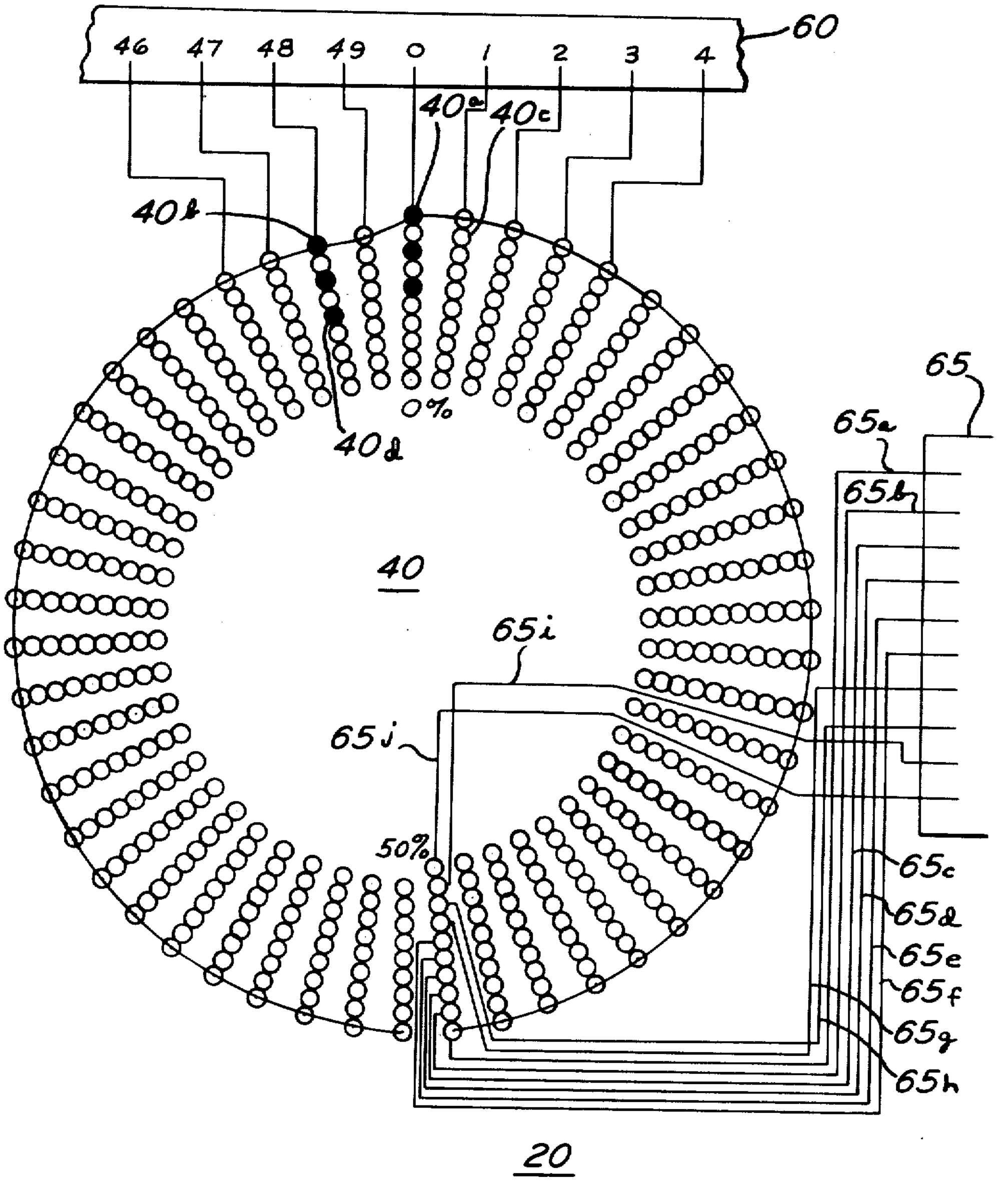
FIG. 4 illustrates in detail a spiral array displaying start-stop mode measurements which may be used with the system of FIG. 1.

Referring now to FIG. 1, there is shown a distortion analysis system which may be used with a rectangular array or display **20*a* shown in FIG. 3, a spiral array 40 shown in FIG. 4 or other applicable shape. Each array or matrix 20*a* and 40 comprises a plurality of light emitting diodes. In rectangular array 20*a*, a diode is provided in each intersection of a column and a row conductor and is connected therebetween. In spiral array 40**, a diode is provided and connected at each intersection of each radius and a ring.

Figure 5A:
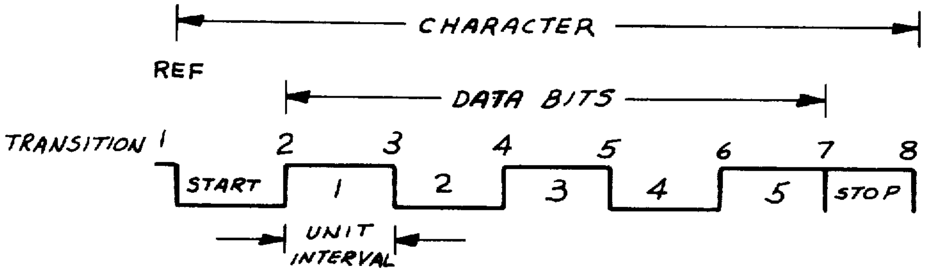
FIG. 5A illustrates a character with all transitions being at their theoretically correct time.
Figure 5B:
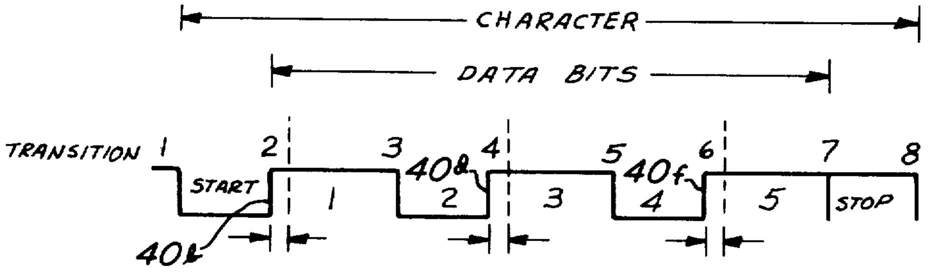
FIG. 5B illustrates a character with transitions not at the theoretically correct time.

The distortion analysis system indicates not only the percentage of distortion present but also distinguishes the specific causes of distortion. This is achieved by displaying the occurrence of each actual transition in a character in its position with respect to the theoretically correct time of occurrence. An example of a character in a five unit start/stop code is illustrated in FIG. 5A, with all of the transitions being at their theoretically correct time. An example of transitions not at the theoretically correct time is shown in FIG. 5B. On the array all of the transitions within the character will be simultaneously displayed with reference to the beginning of the start bit (first or reference transition). Thus, the actual time of occurrence of each transition with respect to the theoretical time will be evident as well as the specific cause of the distortion and the percentage of distortion.

In rectangular array **20*a*, a reference transition or first transition is always indicated by the topmost light emitting diode 20*b* connected to a center column conductor 0. In this way, zero distortion is indicated in the center of the display rather than on one edge. The diodes are placed so that beginning at center column 0, each row is divided into 50 equal parts with each column conductor and diode representing 2 per cent increment of a unit interval. Counter 37, FIG. 1, later described in detail, runs at 50 times the data rate with each count being associated with the next succeeding diode so that starting with zero diode 20*b*, and moving to the right on row conductor 0, the counter moves through the half row and then starting on the left hand of row 1 moves through that half row and at the count of 50, reaches the next center column conductor 0 and zero diode 20*c*. The second transition should occur at that time. Thus, each full row represents one unit interval at the applicable modulation rate. Thus, it will now be understood that the third data transition should occur when the counter again reaches 50, i.e., when it reaches zero diode 20*d***.

As will later be described in detail, the coincidence of a transition and a clock count is required to light a diode in array **20*a*. Thus, if the transition coincides with a 50th clock pulse, it will cause zero diodes 20*c* or 20*d***, for example, to light. The transition will have occurred at its correct time and zero distortion is indicated by the lighting of the zero diode associated with that particular transition. If the transition had occurred coincident with a 51st clock pulse, it would have been two per cent late and this would have been displayed by lighting of a diode to the right of the zero diode. This diode is displaced 2 per cent from the center column 0 thus indicating a 2 per cent distortion. Transitions occurring late with respect to the reference transition indicate "spacing" distortion. Those occurring early indicate "marking" distortion.

The foregoing may be expressed with respect to spiral array **40*a* in which the first or reference transition is always indicated on the outer ring at zero on the zero reference radius. Each 360° segment of the spiral is divided into 2 per cent radial increments of a unit interval. If the second transition is 4 per cent earlier than the correct time on the zero radius, diode 40*b*** will be lit at the 4 per cent point counterclockwise from zero. This indicates that the start bit has been shortened by 4 per cent thereby indicating marking distortion.

If the second transition occurs 4 per cent late, diode **40*c*** would be lit which is at the 4 per cent point clockwise from zero. This would indicate that the start bit has been lengthened by 4 per cent thereby indicating spacing distortion. Accordingly, each transition within the character is similarly displayed on segments of the spiral with reference to the first or start to stop transition. Thus, all transitions are displayed in their positions relative to this reference transition and to each other. Those skilled in the art may examine these relationships and they will understand the type as well as the percentage distortion present.

For example, in FIG. 4, those diodes have been blackened to indicate lit diodes showing marking bias distortion of 4 per cent. Such distortion is illustrated by the waveform of a character in FIG. 5B. Marking bias distortion is indicated by the uniform displacement of all space to mark transitions appearing counterclockwise from the zero radius. It will be noted that all mark to space transitions occur at the proper instant with respect to the zero radius.

DETAILED DESCRIPTION OF OPERATION

Referring to FIG. 1, the following is a detailed description of the distortion analysis system and method in which there is used a five unit start/stop code as illustrated in FIGS. 5A–B. For the initial description, array system 20 will utilize the rectangular array **20*a* of FIGS. 3**A–B.

Figure 2:
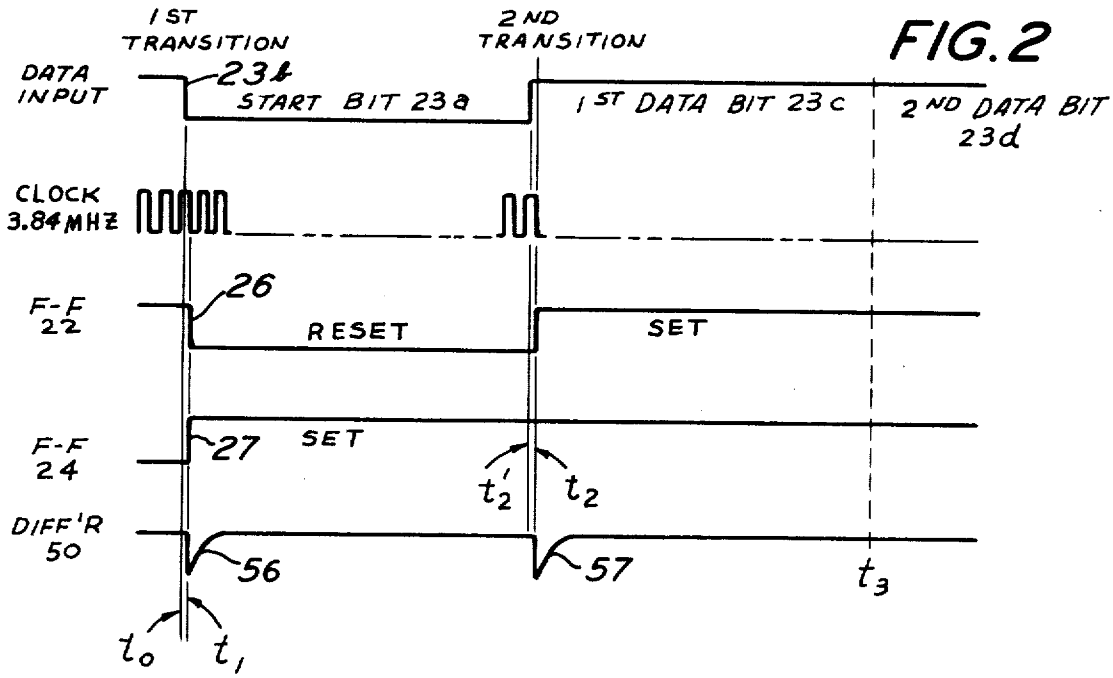
FIG. 2 illustrates waveforms helpful in describing the operation of FIG. 1.

Referring to FIG. 1, oscillator 21 produces a 3.84 megahertz square wave clock output. This frequency is selected so that it will provide the desired data modulation rate of the unit interval with a minimum number of divide by two flip flops. The clock output of oscillator 21 is applied to a clock input of a synchronizing flip flop 22 also having a set and a reset input. The input signal 23 shown in FIG. 2 is applied (1) directly to the set input "S" and (2) by way of an inverter **22*a*** to the reset input "R". The set and reset inputs are enabled by positive going inputs with the flip flop being switched by negative clocks.

The start pulse **23*a* begins at time $t_0$ (first transition) with a negative going reference portion 23*b*. Accordingly, upon application of negative going portion 23*b* which is inverted to a positive going signal, the reset input "R" of flip flop 22 is enabled. Upon application of the next succeeding negative going portion of a clock pulse, at time $t_1$, enabled flip flop 22 is switched from set to reset to produce negative going waveform 26 in FIG. 2**. Since the frequency of the clock is of such large magnitude with respect to the modulation rate, the time difference between times $t_0$ and $t_1$ is negligible and time $t_1$ can be considered as the effective time of the first transition.

This negative going output pulse 26 from flip flop 22 is applied to a gating flip flop 24 setting that flip flop and producing waveform 27. Waveform 27 is maintained in its positive level (set switched condition) until the termination of the entire character which is signaled by output **12*a* of counter 12**.

Flip flop 22 will again be switched to its set state at the beginning of the first forthcoming data bit which occurs having a positive going transition. As shown in FIG. 2, the first data bit 23c occurs at time $t_2'$ and flip flop 22 is switched to its set state at time $t_2$ by the next succeeding negative going clock pulse. Time $t_2$ will be considered as the effective time of the second transition. Flip flop 22 will again be switched to its reset state at the beginning of the next succeeding data bit having a negative transition. In the example of FIG. 2, a negative transition does not occur at time $t_3$. If a transition does not take place until, for example, the stop bit, then flip flop 22 is not reset until the beginning of the stop bit.

The pulse output of flip flop 22 at time $t_1$ is applied to a first differentiator 51 and also by way of an inverter 52, start/stop contact 56b and moveable contact 56a (in its illustrated position) to a second differentiator 53. Differentiators 51 and 53 form a double differentiator 50. The outputs of differentiators 51 and 53 are applied to an OR gate 54 which only passes negative "-strobe" pulses. Accordingly, a first negative strobe pulse 56 at time $t_1$ is passed and the next negative strobe pulse 57 which occurs at time $t_2$ is also passed. Since flip flop 22 is not reset at time $t_3$, differentiator 50 does not produce a pulse at that time. The strobe pulses of differentiator 50 are applied to strobe inputs 58 and 59 of registers 13 and 14 respectively and are each effective to cause these registers to become loaded at times $t_1$ and $t_2$ but not time $t_3$.

The outputs of oscillator 21 and gating flip flop 24 are applied by way of an AND gate 30 to programmable divider 10. AND gate 30 is enabled by positive level 27 of the flip flop 24 and thus, the output of oscillator 21 is directly applied to divider 10. Divider 10 is effective to divide the 3.84 megahertz signal by a count of 256 to produce at output 10a, a square wave signal of 15 kHz. In conventional manner, divider 10 may comprise two divide by 16 counters 32–33 connected in series for a resultant divide by 256. It will be understood that divider 10 may provide other divisions of the oscillator frequency which are useful for specific purposes in measuring data at various modulation rates.

In the specific example of FIG. 1, it is desired to have a modulation rate of 37.5 baud. In another instance, it may be desirable to have a modulation rate of 75 baud instead. Therefore, counters 32, 33 may be selected providing a divide by 128. Similarly for 150 baud, counters providing a divide by 64 would be selected. Thus, it will be understood that the counters of divider 10 may be selected to provide differing division rates as required for specified data modulation rates.

The 15 kHz square wave at output 10a is applied to bit divider 11 which provides a total of a divide by 400 to produce at output 11a, the desired 37.5 Hz square wave for a modulation rate of 37.5 baud. Divider 11 comprises a divide by eight counter 36, the output of which is applied to a divide by 50 counter 37. The divide by 50 counter 37 comprises a six flip flop register, the binary outputs of which are respectively applied to the inputs of a six stage register 13.

It will be understood that the outputs of counter 37 provide a repetitive binary up count of the pulses from counter 36 with the count starting at time $t_1$. The count continues up at 2 per cent increments reaching a count of 49. At the next pulse from counter 36, the 50th pulse, counter 37 is reset to zero. At this time, the transition beginning the first data bit (time $t_2$) theoretically should occur (a transition at 100 percent). At the next count of zero, the transition beginning the second data bit should theoretically occur, etc. Accordingly, in this manner, each data bit is divided into 50 equal parts with each part being two per cent of the total.

As previously described, at time $t_2$, upon application of strobe pulse 57 to register 13, that register is loaded with the binary number then counted by counter 37. That binary number loaded in register 13 is applied by way of six binary outputs 13a–f to a binary to octal decoder 60, FIGS. 3A–B. Octal decoders are well known and are described, for example, at page 3-2.4, et. seq., of Application Memos, Signetics Corporation, Copyright 1969. As described, such decoders may have up to 64 control lines for one-of-sixty-four decoding. However, since the number loaded in register 13 is no higher than 49, then only those control lines are used which correspond to the decimal equivalent of 0–49 (a predetermined value for this embodiment).

The 50 control lines (0–49) from octal decoder 55 are connected to individual ones of the 50 column conductors of display 20a having 10 rows. The control line from decoder 60 corresponding to zero (for 0 per cent error) is connected to the center column conductor. In decimal numerical increasing order starting from zero, each control line is connected in turn to the column conductors to the right of 0 per cent. Each column conductor corresponds to a two per cent increase in per cent error. This continues until the control line corresponding to decimal 24 is reached which is connected to the 48 per cent column conductor. In decimal numerical order starting from 25, each control line is connected in turn to the column conductors starting at the 50 per cent conductor located at the far left. Each column conductor to the right corresponds to a 2 per cent decrease in per cent error.

A conventional light emitting diode is connected between each intersection of a column conductor and a row conductor. Looking from right to left, row conductor 65a extends through row 0, columns 24–0 and then through row 1, columns 49–25. Row conductor 65b extends through row 1, columns 24–0 and then through row 2, columns 49–25. The remaining row conductors 65c–j are connected in similar manner through the rows.

As later described in detail, row conductors 65a–g may be energized in turn starting from conductor 65a. At the time of the first transition, time $t_1$, conductor 65a may be energized. When counter 37 counts fifty pulses from counter 36 for a unit interval, zero column conductor 0 is reached and row conductor 65b may be then energized. Accordingly, if transition time, $t_2$, occurs at a 50th count, then diode 20c is lit. However, if the transition time, time $t_2$, occurs at a count of 48, it will be understood that the transition occurs 4 per cent earlier than its theoretically correct time. Accordingly, an element in column 48 and row 1 is lit. At the next count of zero, for the next unit interval, row conductor 65c may then be energized.

The sequential energization of the row conductors is provided by converter 65 which is controlled in the following manner. The 37.5 Hz output of divider 11 provides a pulse indicating each unit interval. The unit interval pulses are effectively counted by a divide by seven character divider 12. Divider 12 comprises a four stage counter which counts from zero up to six and then is reset to its original state and repeats its up count. The outputs of the four stages are applied to corresponding binary outputs of a four stage register 14 similar in structure and operation to six stage register 13. Register 14 is only loaded with the contents of divider 12 (unit interval count) upon application of a strobe from differentiator 50. The binary number that is loaded in register 14 is then applied by way of the four binary outputs 14*a–f* to a binary-to-decimal converter 65 in array system 20, FIGS. 3A–B. Binary-to-decimal converters are well known in the art and are described, for example, at page 3-2.3 of the above cited Application Memos. Converter 65 is effective to convert the binary information that is loaded in register 14 indicating the number of unit intervals that have been counted into a decimal equivalent.

In this manner, in turn each of the row conductors 65*a–g* may be energized but only when a respective strobe signal occurs indicating an actual transition. Thus, each succeeding row conductor 65*a–g* may be selected starting with the first transition at time $t_0$ with the time of energization separated by the fiftieth count (a unit interval) by counter 37.

Divider 12 may be programmed to provide other than divide by seven for a unit code of five having seven unit intervals. A unit code of six requires a divide by eight; a unit code of seven requires a divide by nine; and a unit code of eight requires a divide by ten. In the latter case, all the row conductors 0–9 may be selected.

It will now be understood that at the time of each strobe pulse indicating an actual transition, such as strobe 57 at time $t_2$, registers 13 and 14 are loaded and a respective light element in array 20*a* is lit. That light stays lit until the application of the next strobe pulse indicating the next actual transition.

As previously described, spiral array 40, shown in FIG. 4, may be used in place of the rectangular array 20*a* for the array system 20 in FIG. 1. Spiral array 40 is the same as rectangular array 20*a* except that the left and right hand ends of the rows 0–9 are formed in a spiral design. Thus, it will be seen that in FIG. 4, conductor 65*a* is connected to all of the diodes in the outer ring which corresponds to row 0, columns 0–24 and row 1, columns 25–49. The zero center column in FIGS. 3A–B is the same as the zero radius in FIG. 4.

At the end of a character, counter 12 will have completed its count of seven unit intervals of data for unit code of five and produces a single pulse signal at output 12*a*. This signal is effective to reset flip flop 24 causing waveform 27 to become negative going thereby disabling AND gate 30.

In addition, flip flop 24 produces a reset pulse which is applied to reset counters 12, 32, 33, 36 and 37 and registers 13 and 14. In this manner, the distortion analyzer of FIG. 1 is in a quiescent state awaiting the next character.

At a first transition (reference time) of each character, a first strobe pulse 56 is produced, for example, thereby lighting light 20*b* located at zero column conductor and row zero. This diode is always lit at the first transition since all of the counters and registers have been reset and counters 12 and 37 are both at a zero count.

In the previously described start/stop mode measurements, transitions within a character are displayed with reference to the beginning of the start bit. The distortion analysis system may also be used for synchronous mode measurements in which a synchronous series of data bits (having no start bit) are compared to a station control clock. A display is provided of the phase and frequency relationship between the data bits and the station clock; the clock having a frequency equal to twice the modulation rate of the data bits.

As shown in FIG. 1, the data bits are applied to data input 23 and moveable contact 56*a* is moved to engage contact 56*c* connected to an external station control clock 21*a*. Accordingly, the clock signals from station clock 21*a* are applied to differentiator 53. Of the resultant negative and positive pulses, only the negative strobe pulses from differentiator 53 are passed by OR gate 54. A first applied negative transition of the data bits is effective to enable flip flop 22. Upon application of the next succeeding negative portion of a clock pulse from clock 21, enabled flip flop 22 is switched from set to reset in the manner previously described. Flip flop 22 is thereafter switched on each transition of the data bits with the resultant signal being applied only to differentiator 51 since switch 56*a–c* is in the sync external position. Accordingly, only negative strobe pulses from differentiator 51, produced during each negative transition of the data bits, are passed by gate 54. The operation of the system of FIG. 1 continues in the manner previously described, with only the negative transition of the data bits and the negative transition of the station clock being displayed.

Figure 6:
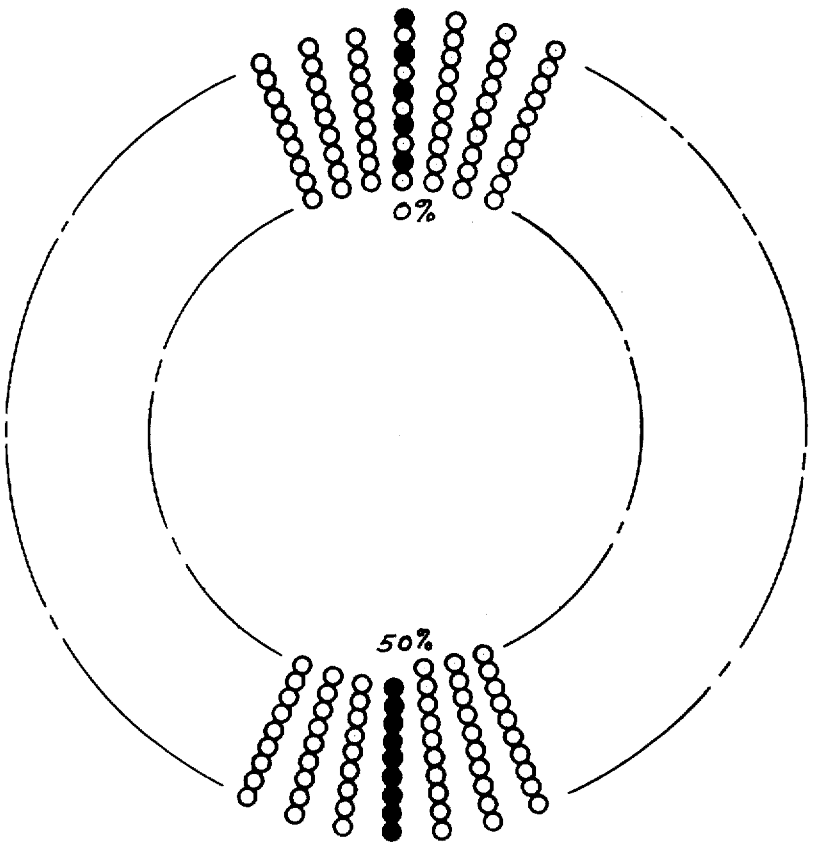
FIG. 6 illustrates the spiral array of FIG. 4 in which synchronous mode measurements are displayed.

In conventional synchronous transmission, the station control clock produces clock signals having negative transitions (mark to space transitions) 180° displaced from the transitions of the data bits. Thus, if the clock and data relationship is perfect, as shown in FIG. 6, the clock transitions are displayed by the lighting of diodes at the 50 per cent radius while the data is displayed on the zero radius. Since the clock is at twice the modulation rate of the data, all the lights are lit in the clock radius as compared with half in the data radius. A fixed displacement of lighted diodes indicating clock signals either in a clockwise or counterclockwise direction from the 50 per cent radius indicates a phase lag or lead respectively of the clock with respect to the center of the data bit. A movement of a radius of lighted diodes either in a clockwise or counterclockwise direction is indicative of a speed error of the clock relative to the data, either slow or fast respectively.

For purposes of description, it will be understood that array system 20 may be generally defined as a sequence of groups of elements arranged in a first direction and a sequence of groups of elements arranged in a second direction. The first direction group generally refers to the columns in FIGS. 3A–B and the radii of FIG. 4. The second direction group generally refers to the rows of FIGS. 3A–B and the rings of FIG. 4. The array may also be defined as having columns and mapped rows. The columns are the columns of FIGS. 3A–B and the radii of FIG. 4, while the mapped rows are the rows of FIGS. 3A–B and the rings of FIG. 4.

While the differing counters previously described are well known in the art, the following are specific examples of circuits that may be used:

Counter 37 — At page 2-1.58 of the above cited Application Memos, there is shown a Cascaded Variable Modulus Counter (8280/8281) which may detect a count to fifty and then be reset to zero. From left to right, the ABCDAB outputs may be connected to register 13.

Counter 12 — At page 2-.157 of the above cited Application Memos, there is shown a Single Storage Counter (8280) in which the outputs ABCD may be connected to register 14.

Counters 32, 33 and 36 — Millman and Taub: Pulse, Digital and Switching Waveforms, McGraw-Hill Book Co., New York, 1965, Chapter 18.

What is claimed is:

1. A distortion analysis system for displaying with respect to a series of bits applied at a predetermined modulation rate the occurrence of each actual bit transition in its position with reference to a predetermined time comprising a plurality of light emitting elements formed in an array defining (1) a sequence of groups of elements arranged in a first direction and (2) a sequence of groups of elements arranged in a second direction, with each element being in both a first and a second direction group.

first means for counting up by a first count to a predetermined value starting at said predetermined time and thereafter continuously repeating said first count, each count in a first count being associated with a different one of said first direction groups, second means for counting up by a second count each time said first count reaches said predetermined value, each of said second counts being associated with a different one of said second direction groups, and means for detecting the first and second counts which have accrued at the time of each transition for lighting an element which is in both (1) a first direction group associated with the accrued first count and (2) a second direction group associated with the accrued second count.

2. The distortion analysis system of claim 1 in which said series of bits is a character of bits applied at a predetermined data modulation rate and said predetermined time is the time of a first transition of the character.

3. The distortion analysis system of claim 2 in which said first counting means provides said first count at a rate equal to said predetermined value multiplied by said data rate.

4. The distortion analysis system of claim 3 in which said second counting means produces a reset signal after said second count reaches a value corresponding to the number of bits in said character.

5. The distortion analysis system of claim 4 in which there is provided means for applying said reset signal to said first and second counting means for resetting said first and second counts to zero whereby said first and second counting means are in a quiescent state awaiting the next character.

6. The distortion analysis system of claim 3 in which said detecting means includes first and second register means respectively loaded with said first and second count at the time of each transition.

7. The distortion analysis system of claim 6 in which there is provided an individual first conductor associated with each first direction group and an individual second conductor associated with each second direction group, each of said elements being connected to its associated first and second conductors.

8. The distortion analysis system of claim 7 in which there is provided first decoder means for energizing a first conductor corresponding to the first count loaded in said first register.

9. The distortion analysis system of claim 8 in which there is provided second decoder means for energizing a second conductor corresponding to the second count loaded in said second register, and switching means for producing a strobe pulse at the time of each transition for actuating said first and second register means to load.

10. A distortion analysis system having applied thereto characters each having a predetermined number of bits at a selected data modulation rate for displaying the occurrence of each actual transition of bits in a character in its position with reference to a first transition comprising a plurality of elements which emit light upon being energized formed in a matrix of columns and mapped rows with an individual element connected at an intersection of a column and a mapped row, first means for counting up by a first count to a predetermined value beginning at the time of a first transition and thereafter continuously repeating said first count until being reset, said first counting means providing said first count at a rate equal to said predetermined value multiplied by said data rate, each unitary count in said first count being associated in sequence with a different one of said columns, second means for providing a second count for counting up one each time said first count reaches said predetermined value, each unitary count in said second count being associated in sequence with a different one of said mapped rows, and means for detecting the first and second counts which have accrued at the time of each transition for applying element energization signals to both (1) a column associated with the accrued first count and (2) mapped row association with the accrued second count.

11. The distortion analysis system of claim 10 in which said detecting means includes first and second register means respectively connected to said first and second counting means, at the time of each transition said first register means being loaded with said first count and said second register means being loaded with said second count.

12. The distortion analysis system of claim 11 in which there is provided a separate column conductor associated with each column and a separate row conductor associated with each mapped row, each of said elements being connected to its associated column and row conductors at the intersection thereof.

13. The distortion analysis system of claim 12 in which there is provided first decoder means for applying an element energization signal to a column conductor corresponding to the first count loaded in said first register.

14. The distortion analysis system of claim 13 in which there is provided second decoder means for applying an element energization signal to a row conductor corresponding to the second count loaded in said second register.

15. The distortion analysis system of claim 10 in which said second counting means produces a reset signal when said second count reaches a value corresponding to the number of bits in said character.

16. The distortion analysis system of claim 15 in which there is provided means for applying said reset signal to said first and said second counting means (1) for resetting said first and second counts to zero and (2) for maintaining said first and second counting means in a quiescent state awaiting the next character.

17. The distortion analysis system of claim 10 in which there is provided switching means for producing a strobe pulse at the time of each transition in a character for actuating said first and second register means to become loaded with said first and second count respectively.

18. The distortion analysis system of claim 10 in which each of said elements is a light emitting diode.

19. The distortion analysis system of claim 10 in which said matrix is formed in the shape of a rectangle with said columns forming parallel columns of the rectangle and said mapped rows forming parallel rows of the rectangle.

20. The distortion analysis system of claim 10 in which said matrix is formed in the shape of a spiral in which said columns are formed as radii of the spiral and the mapped rows are formed as rings of the spiral.

21. A method for distortion analysis of a character of bits applied at a predetermined data modulation rate by displaying each actual bit transition on an array of light emitting elements formed in columns and mapped rows which comprises the steps of counting up by a first count to a predetermined value starting at a first transition of the character and thereafter continuously repeating the first count.

associating each unitary count in a first count with a different one of the columns, counting up one by a second count each time the first count reaches the predetermined value, associating each unitary count in a second count with a different one of the mapped rows, and detecting the first and second counts which have accrued at the time of each transition for lighting an element which is in both (1) a column associated with the accrued first count and (2) a mapped row associated with the accrued second count.

22. A distortion analysis system for displaying with respect to a series of bits from a clock applied at a predetermined modulation rate the occurrence of each actual clock bit transition of selected polarity in its position with reference to a selected first bit transition of a series of data bits comprising a plurality of light emitting elements formed in an array defining (1) a sequence of groups of elements arranged in a first direction and (2) a sequence of groups of elements arranged in a second direction, with each element being in both a first and a second direction group.

first means for counting up by a first count to a predetermined value starting at said first transition and thereafter continuously repeating said first count, each count in a first count being associated with a different one of said first direction groups, second means for counting up by a second count each time said first count reaches said predetermined value, each of said second counts being associated with a different one of said second direction groups, and means for detecting the first and second counts which have accrued at the time of each clock bit transition for lighting an element which is in both (1) a first direction group associated with the accrued first count and (2) a second direction group associated with the accrued second count.

23. The distortion analysis system of claim 22 in which said clock modulation rate is equal to twice that of said data bits.

* * * * *